April 14, 1970     R. M. L. LINDQUIST     3,506,378
METHOD AND APPARATUS FOR MOVING FLUIDS
Filed May 2, 1969     3 Sheets-Sheet 1
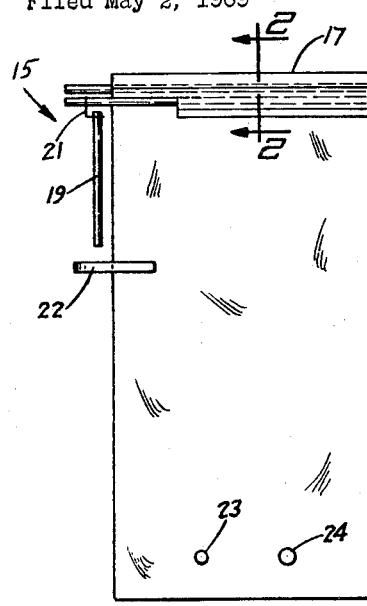
FIG.1
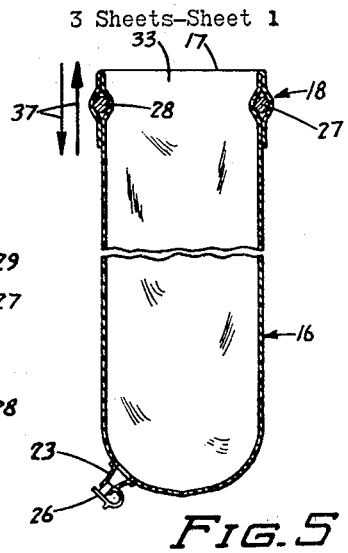
FIG.2
FIG.5
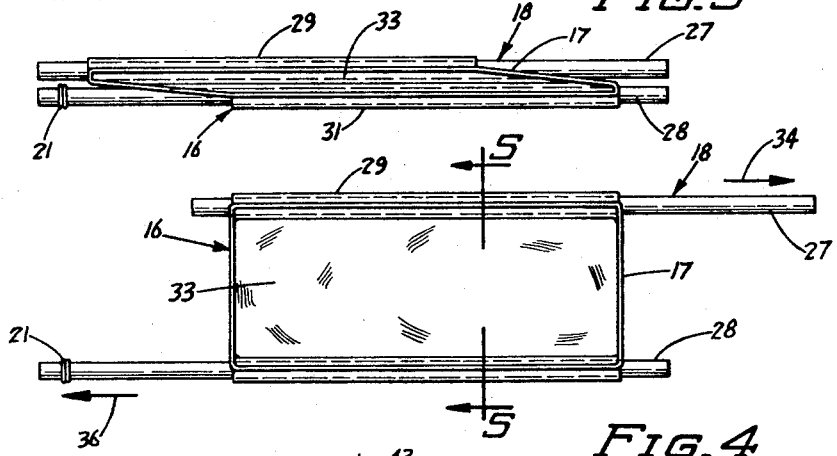
FIG.3
FIG.4
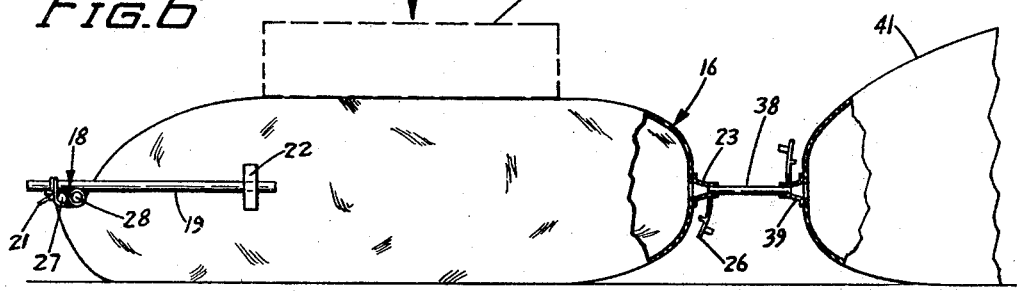
FIG.6
INVENTOR.
ROBERT M. L. LINDQUIST
BY
Burd, Braddock & Barty
ATTORNEYS April 14, 1970 R. M. L. LINDQUIST 3,506,378
METHOD AND APPARATUS FOR MOVING FLUIDS
Filed May 2, 1969 3 Sheets-Sheet 2
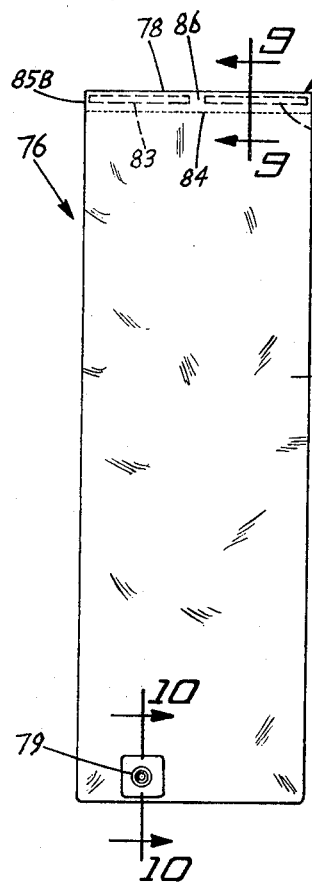
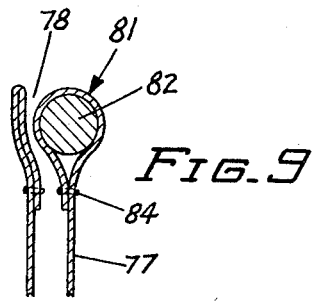
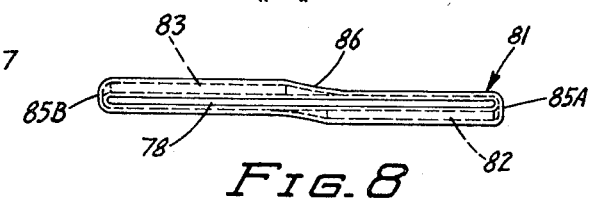
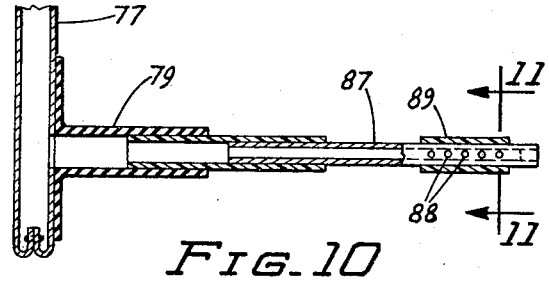
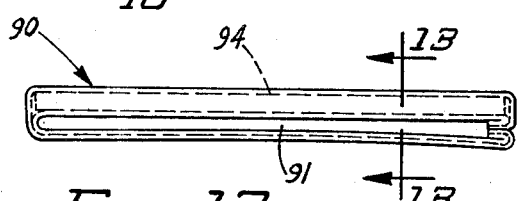
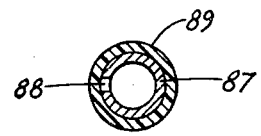
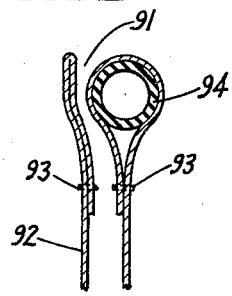
INVENTOR.
ROBERT M. L. LINDQUIST
BY
Burd, Braddock & Bartz
ATTORNEYS April 14, 1970 — R. M. L. LINDQUIST — 3,506,378
METHOD AND APPARATUS FOR MOVING FLUIDS
Filed May 2, 1969 — 3 Sheets-Sheet 3

INVENTOR.
ROBERT M. L. LINDQUIST
BY
Burd, Braddock & Bartz
ATTORNEYS

United States Patent Office 3,506,378
Patented Apr. 14, 1970

3,506,378
METHOD AND APPARATUS FOR MOVING
FLUIDS
Robert M. L. Lindquist, 7912 NE. 6th St.,
Minneapolis, Minn. 55432
Continuation-in-part of application Ser. No. 680,237,
Nov. 2, 1967. This application May 2, 1969, Ser.
No. 821,228
Int. Cl. F04b 45/00
U.S. Cl. 417—53   14 Claims

ABSTRACT OF THE DISCLOSURE

A method and bag pump apparatus providing a supply of fluid, as air, for inflating purposes. The apparatus comprises a collapsible bag having closure members comprising a pair of rods attached to opposite sides of the mouth end of the bag. One or more outlet nipples are secured to the bottom of the bag. The rods function as handles used to hold the mouth of the bag open and as rollers in closing and reducing the volume of the bag to make the bag taut. Attached to the closure rods is a lock arm which cooperates with a loop secured to the side of the bag to hold the closure rods in a rolled closed position. The method of supplying the fluid, as air, is commenced by filling the bag with fluid. When the bag is full of fluid the mouth is closed in flat side-by-side relation to trap the fluid in the bag. The air is driven from the bag by reducing the volume of the bag to increase the pressure of the fluid in the bag. The volume of the bag is first reduced by longitudinally rolling the mouth end of the bag and then applying force to the bag. One form of apparatus has closure members which permit the rolled end of the bag to be turned into a V-shape so that the rolled end can be telescoped into the bag to drive fluid from the bag. The rolled mouth of the bag is folded to form a piston and then forced axially in telescope relation into the bag to force fluid out through the outlet nipples.

CROSS REFERENCE TO RELATED APPLICATION

Figure 14:
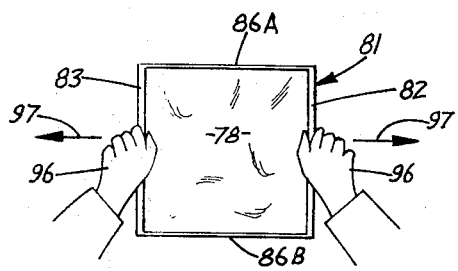

This application is a continuation-in-part of U.S. application Ser. No. 680,237 filed Nov. 2, 1967, now Patent No. 3,456,873.

SUMMARY OF THE INVENTION

The invention relates to a method and a bag pump apparatus providing an effortless way of supplying air under pressure to a receiver, as air mattresses, inflatable toys, rubber boats and like inflatable structures. This is accomplished by a collapsible bag used to trap a quantity of air which is forced into the receiver by reducing the volume of the bag. The collapsible bag has a flexible wall and a mouth end with a flexible mid-section associated with closure means for opening and closing the mouth of the bag. The closure means permits the closed mouth to be rolled and then folded into a V-position. An outlet is secured to the wall attachable to the inlet of the receiver so that the trapped air in the bag can be forced into the receiver by forcing the folded V-mouth into the bag. The flexible wall of the bag enables the apparatus to be rolled into a compact item easy to store and carry.

The method of transferring air into a receiver using a flexible bag having a mouth and an outlet includes the steps of opening the mouth of the bag, collecting air in the bag by increasing the static pressure of the fluid in the bag. After the mouth of the bag is closed, rolled and folded into a V, the volume of the bag is reduced whereby the air in the bag flows from the bag into the receiver.

Figure 17:
Figure 15:
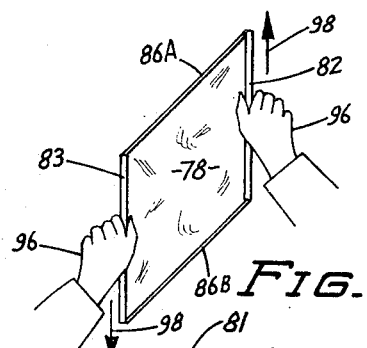
Figure 16:
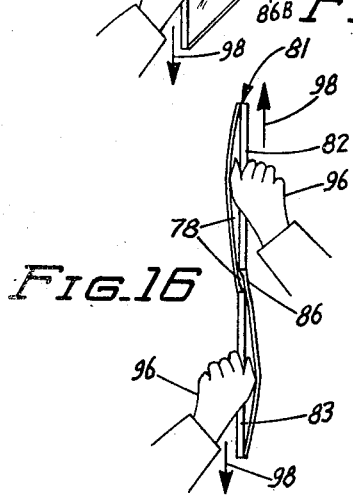
Figure 18:
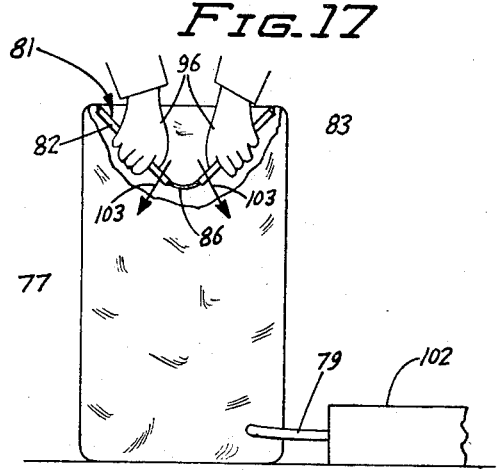
Figure 19:
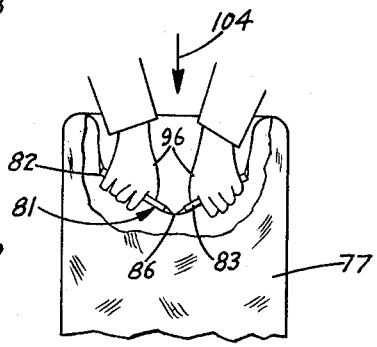

In the drawings:

FIGURE 1 is a side view of one form of a bag pump apparatus of the invention;
FIGURE 2 is an enlarged sectional view taken along the line 2—2 of FIGURE 1;
FIGURE 3 is an enlarged top view of the mouth end of the bag pump apparatus of FIGURE 1;
FIGURE 4 is a view similar to FIGURE 3 showing the mouth end of the bag open;
FIGURE 5 is a longitudinal sectional view of the bag along line 5—5 of FIGURE 4 illustrating the inflation of the bag;
FIGURE 6 is a side view of an inflated bag pump apparatus attached to a receiver with a force supplied to one side of the bag to move fluid from the bag into the receiver;
FIGURE 7 is a side view of another form of a bag pump apparatus of the invention;
FIGURE 8 is an enlarged top view of the mouth end of the bag pump apparatus of FIGURE 7;
FIGURE 9 is an enlarged sectional view taken along the line 9—9 of FIGURE 7;
FIGURE 10 is a longitudinal sectional view of a shower outlet usable with the bag pump apparatus of FIGURE 7;
FIGURE 11 is an enlarged sectional view taken along the line 11—11 of FIGURE 10;
FIGURE 12 is a top view of a bag pump apparatus with a modified closure means;
FIGURE 13 is an enlarged sectional view taken along the line 13—13 of FIGURE 12;
FIGURE 14 is a top view of the open mouth of the bag pump apparatus;
FIGURE 15 is a top view of the mouth partially closed;
FIGURE 16 is a top view of the closed mouth;
FIGURE 17 is a diagrammatic view of a bag pump apparatus showing the mouth end closed and rolled;
FIGURE 18 is a diagrammatic view of a bag pump apparatus showing the rolled mouth folded; and
FIGURE 19 is a diagrammatic view similar to FIGURE 18 showing the rolled folded mouth forced axially into the bag to drive fluid from the bag.

Referring to the drawings, there is shown in FIGURE 1, the bag pump apparatus of this invention indicated generally at 15 for collecting and moving air into a receiver, as a container or inflatable item. The receiver can be any item for storing a fluid, as air or water. Alternatively the fluid can be directed to any place or item requiring a stream of moving fluid.

Bag pump apparatus 15 comprises an elongated flexible walled bag indicated generally at 16 having a mouth 17. Closure means 18 cooperates with the mouth of the bag to either hold the mouth open or seal the mouth to trap the fluid in the bag. The following description is limited to air as the fluid used in conjunction with the bag pump apparatus. Air is used only by way of example as other fluids including gases and liquids can be moved by the bag pump apparatus of the invention. An elongated lock arm 19 attached to closure means 18 with a flexible link 21, as a cord, cooperates with a loop 22 on the side of the bag 16 to hold the closure means in a closed position. Secured to the bottom portion of bag 16 are a pair of outlet nipples 23 and 24 closed with removable plugs 26. Nipples 23 and 24 are of different sizes to accommodate various sized connections to the air receiver. A single nipple with a plurality of different sized tapered tubular members and a removable plug can be used as an outlet for the bag. Also, a single nipple with a removable plug can be used with the bag.

Bag 16 is an elongated tube having flexible and foldable walls that open at one end of mouth 17. The bag may be formed from flexible air impervious material, as vinyl, polyethylene, or other homogeneous material. Alternatively, the bag may be made of materials as coated fabric, rubberized nylon, paper and the like. The shape of the bag may vary from rectangular, tubular pillow-shaped, prism shaped, and may be straight or tapered. Bag 16 is shown in the drawings as having an elongated rectangular shape; for example, the bag can have a width of twenty four inches and a length of forty eight inches.

As shown in FIGURES 1 to 4 closure means 18 comprises a pair of transverse rods 27 and 28 attached to opposite sides of the mouth 17. The mouth of the bag is along one of the short dimensions of the bag so that the motion of the bag relative to the air has a minimum of resistance to the expansion of the bag. Offset portions 29 and 31 of the mouth of the bag are lapped over the rods 27 and 28 forming passageways for the rods. Adhesive materials may secure the rods to the bag material. Loops or links attached to the rods and bag can be used in lieu of the adhesive material. Rod 27 is secured to approximately three-quarters of one side of the mouth and rod 28 is secured to approximately three quarters of the opposite side of the mouth. The peripheral end of the mouth is joined together with a heat steel, stitching or cementing to form a lip 32 surrounding the mouth 17. As shown in FIGURE 4, rods 27 and 28 move apart and in opposite directions as shown by the arrows 34 and 36 relative to each other to spread the mouth forming inlet opening 33. The shape and size of the inlet 33 is designed for child safety, air flow requirements and ease of operation of the closure means. The open dimension of the mouth should be such that it will not admit a child's head. In bags where child safety is not a factor the open dimension of the mouth can be increased to provide a maximum opening. Relative movement of the rods 27 and 28 back to their aligned positions as shown in FIGURE 3 closes mouth opening 33 to trap the air within the bag cavity.

The method of transferring air with the bag pump apparatus 15 is illustrated in FIGURES 3 to 6. The mouth inlet opening 33 of bag 16 is initially opened providing the bag with a maximum inlet. The exit plugs 26 would have been inserted in the outlet nipples at the bottom of the bag so that air can be collected in the bag cavity. As shown in FIGURE 4, mouth inlet opening 33 is opened by moving rods 27 and 28 in opposite directions and away from each other providing the bag with a rectangularly shaped inlet opening. Air is collected in the bag by increasing the static pressure of the air in the bag cavity. This can be accomplished by moving the bag relative to the air or holding the bag with the open mouth in a stream of air.

As shown in FIGURE 5 for one method of moving the bag relative to the air, the entire bag is sequentially moved in up and down directions, as indicated by arrows 37, to fill the bag with air by increasing the static pressure of the air in the bag cavity. The air is collected in the bag by holding the mouth 17 open during the up-stroke and then closing the mouth by moving the rods 27 and 28 toward each other on the down-stroke. The opening and closing of mouth 17 is sequentially repeated until the desired amount of air is in the bag 16.

Mouth 17 is closed and sealed in side-by-side relation by rolling the mouth end 17 of the bag about the rods 27 and 28. As shown in FIGURE 6, the bag material wraps or rolls tightly around both rods 27 and 28 with the pressure of the air in the bag sealing the bag walls against each other. In addition to forming a seal at the mouth of the bag rolling of the bag on the rods reduces the volume of the bag thereby increasing the pressure of the air in the bag.

Lock arm 19 rotates with the rods 27 and 28 and may be used as a crank arm to simultaneously turn the rods to roll up the mouth of the bag. The lock arm 19 is placed in a lock position by inserting the free end of the arm into the loop 22 thereby preventing the reverse movement of the arm and unrolling of the mouth.

A tubular member 38 is used to connect outlet nipple 23 with the inlet nipple 39 of an air receiver 41, as an inflatable mattress, boat and the like. The volume of the bag 16 is reduced to increase the pressure of the air in the bag thereby increasing the flow of air from bag 16 into receiver 41. A weight 42 applying a downward pressure, as shown by arrow 43, on the top of the bag is used to collapse the bag until the volume of the bag approaches zero. The weight can be a person sitting on the side of the bag or a block of material. The process of filling and emptying the bag 16 is repeated until the receiver 41 has a desired amount of air.

Referring to FIGURES 7, 8, and 9, there is shown a modified bag pump apparatus indicated generally at 76 comprising an elongated flexible bag 77 having a mouth end 78 and an outlet 79. The bag 77 is an elongated tube having flexible and foldable walls formed from flexible air impervious material, as a coated rubberized nylon, polyethylene, canvas, paper, coated fabrics and the like.

Associated with the mouth 78 is a closure means indicated generally at 81 comprising a first rigid rod 82 on one side of the mouth and a second rigid rod 83 on the opposite side of the mouth. Rods 82 and 83 are loctaed in a top peripheral hem formed by stitches 84. The rods 82 and 83 can be taped or otherwise attached to the mouth. The rod 82 extended from the mouth edge 85A toward the center of the side is shorter than one-half the width of the mouth. In a similar manner, rod 83 extended from the opposite edge 85B toward the center of the side has a length less than one-half the width of the mouth. The mouth center section 86 between the adjacent ends of the rods of the closed mouth is flexible or bendable as the adjacent ends of the rods do not reinforce each other. A substantial portion of the hem at the mouth of the bag is flexible. As shown in FIGURES 14 and 15 the flexible link portions 86A and 86B of the mouth join corresponding ends of the rods 82 and 83. When the mouth 78 is closed as shown in FIGURES 7, 8, and 9, the facing side of the mouth of the bag are in a side-by-side linear relationship thereby eliminating bunching and folding of the closed mouth end of the bag.

The flexible link portions 86A and 86B permit unrestricted bending of the mid-section of the rolled mouth of the bag. The mouth can be bent in any direction to reduce the transverse size of the mouth so that it can be forced or telescoped into the bag to function as a piston to increase the pressure of the fluid in the bag.

As shown in FIGURE 10, the outlet 79 is a tubular member secured to bag 77 and adapted to receive the nipple of a receiver or other fluid carriers. In FIGURES 10 and 11, the outlet 79 carries a shower head comprising an elongated tube 87 having a plugged outer end. Adjacent its outer end the tube 87 has a plurality of holes 88 for dispensing a plurality of streams of liquids, as water.

Telescoped in a sliding relationship over the tube 87 is a sleeve 89 which functions as a valve to close the holes 88. The sleeve 89 can be moved axially along the tube 87 to open one or more of the holes 88. The bag apparatus 76 can be used as a portable shower by merely placing water in the bag and supporting the bag in an elevated position. The sleeve 88 is moved relative to the tube 87 to regulate the flow of water.

Referring to FIGURES 12 and 13, there is shown a modified flexible closure means indicated generally at 90 cooperating with the mouth end 91 of a flexible bag 92. The mouth end 91 of the bag has a hem formed by stitches 93. Located along one side of the bag within the hem is an elongated flexible member 94, as a rubber tube or flexible rod, which serves as a support and roller member for the mouth end of the bag. The flexible member 94 is normally in an elongated linear position as shown in FIGURE 12 so that it will automatically close the bag when the holding forces necessary to open the mouth of the bag are released. Member 94 being flexible can be folded in an upright generally V-position so that the rolled and folded mouth end of the bag can be forced axially in a telescoping relation into the bag 92 to drive the fluid from the bag. A second flexible member can be retained in the opposite side of the mouth.

The method of moving fluid, as air, into a container or receiver with the flexible bag pump apparatus 75 is shown in FIGURES 14 to 19. The mouth 78 of the bag is held in an open position by gripping the rods 82 and 83 with the hands 96 and applying forces in opposite directions as shown by arrows 97. This places the flexible connecting link portions 86A and 86B of the bag in substantial parallel relationship providing for the maximum opening of the mouth end of the bag and shaping of the bag to a large volume configuration.

The air is collected in the bag by increasing the static pressure of the air in the bag cavity. This can be accomplished by moving the bag in relatively short up and down movements or holding the bag with the mouth open in a stream of air. The air can also be collected in the bag 77 by short shaking movements or by longer sequential up and down movements in conjunction with the opening and closing of the mouth as shown in FIGURE 5. When the desired amount of air is in the bag, the mouth 78 is closed and sealed in a side-by-side linear relationship by changing the direction of the forces on the rods 82 and 83. The hands 96 are moved in opposite transverse directions as indicated by arrows 98 so that the rods will swing in substantially parallel relationship, shown in FIGURE 16, placing the adjacent inside portions of the mouth of the bag in side-by-side surface contact without wrinkles or bunches.

The closed mouth of the bag is then linearly rolled as shown in FIGURE 17 in the direction of the arrow 101 to form a roll 99 about the closure means 81. The roll seals the mouth of the bag and also reduces the volume of the bag making the walls of the bag taut by increasing the pressure of the air trapped in the bag. With the outlet 79 connected to the inlet of a receiver or container 102, the air can now be forced from the bag 77 into the receiver 102.

As shown in FIGURE 18, the rolled end mouth and the closure means is folded in a downward direction to form a generally upright V-shape in the transverse plane of the closure means. The mid-section 86 of the mouth is a transition area that flexes and projects downwardly into the bag. The rolled folded mouth of the bag lies in the transverse plane of the closure means with the center flexible section 86 being the mid-portion of the V-shape. The inner ends of the rods 82 and 83 are pivoted downwardly and away from each other into the bag as shown by the arrows 103. This reduces the transverse length of the closure means so that it is smaller than the outside of the diameter of the expanded bag 77.

Referring to FIGURE 19, there is shown the forcing of the trapped fluid from the bag 77 by telescoping the folded rolled mouth and folded closure means 81 axially into the bag. The folded closure means along with the rolled end serves as a piston which is forced into the bag in the direction of the arrow 104 to drive the fluid from the bag. The pressure of the air in the bag keeps the bag walls under tension whereby they serve as a cylinder for the folded rolled mouth piston. In addition, the closure means provides convenient gripping handles for the hands 96.

After the folded closure means is forced a distance into the bag, the rolled folded mouth end of the bag is moved outwardly back to its initial position and unfolded. The mouth end is rolled to further reduce the volume of the bag. The rolled mouth and closure means are then folded back into a generally V-shape and forced axially into the bag to drive further fluid from the bag.

In summary, the method and apparatus of filling and captivating fluid, as air, in a flexible walled container of the elongated bag type of this invention achieves economically the degree of specificity of motion and positiveness of action to accomplish an orderly approach to filling, closing and forcing the fluid out of the flexible walled container. Of special significance is the mouth structure or closure means of the apparatus that provides positive opening of the mouth, shaping of the mouth to a large volume for quickly gathering a large volume of fluid and a fast and positive closure of the mouth to capture the fluid and then facilitate the sealing of the fluid in the elongated bag. Furthermore, the flexibility of the mid-portion of the closure means permits the rolled mouth end of the bag to be formed or bent into a generally V-shape so that it can be driven in a telescopic and orderly piston in cylinder manner into the bag filled with fluid. These positive and orderly steps of transferring a fluid, coupled with a relatively low cost of the apparatus, is a practical and economical means of inflating devices with fluid or providing fluid for other purposes.

While there have been shown and described preferred embodiments of the invention it is to be understood that various changes in the bag pump apparatus and method including the closure means, the bag material and the size and shape of the bag and closure means, may be made by those skilled in the art without departing from the spirit of the invention.

The embodiments of the invention in which an exclusive property or privilege is claimed are defined as follows:

1. A method of moving fluid into a receiver with a flexible bag having a mouth with flexible closure means and an outlet comprising: opening the mouth of the bag, collecting fluid in the bag through the opened mouth, closing the mouth of the bag in side-by-side relation to trap the collected fluid in the bag, sealing the mouth end of the bag by longitudinally rolling the closure means into the closed mouth of the bag to increase the pressure of the fluid in the bag, folding the closure means and rolled mouth of the bag into the bag and then forcing folded rolled end of the bag and closure means axially into the bag in a telescoping relation to drive fluid trapped in the bag into a receiver connected to the outlet of the bag.

2. The method of claim 1 wherein: fluid is collected in the bag by moving the bag upwardly with the mouth open and then closing the mouth.

3. The method of claim 1 wherein: fluid is collected in the bag by shaking the bag up and down with the mouth open.

4. The method of claim 1 wherein: the mouth is closed by moving the closure means in opposite transverse directions positioning the mouth in substantially parallel side-by-side relation.

5. The method of claim 1 wherein: the rolled mouth of the bag is folded into a general upright V-shape.

6. The method of claim 1 wherein: the mid-section of the rolled mouth flexes into the bag during the folding of the rolled mouth.

7. The method of claim 1 wherein: after the folded closure means is forced a distance into the bag the rolled folded mouth end of the bag is moved outward, rolled additionally after unfolding to further reduce the volume of the bag, and then folded and forced into the bag.

8. An apparatus for moving fluid into a receiver having an inlet comprising: a collapible bag having a flexible wall, a mouth selectively movable to open and closed positions, and an outlet secured to said wall, said outlet attachable to the inlet of the receiver whereby fluid in the bag can flow into the receiver, and closure means associated with the mouth of the bag for closing the mouth to trap fluid in the bag whereby when the volume of the bag is reduced fluid is directed from the bag into the receiver, said closure means comprising a first rigid member retained by one side of the mouth of the bag and a second rigid member retained by the opposite side of the mouth of the bag, said first rigid member being shorter than the width of the closed mouth of the bag and projected from one edge of the bag, and said second rigid member being shorter than the width of the closed mouth of the bag and projected from the opposite edge of the bag.

9. The apparatus of claim 8 wherein the closure means comprise a first elongated linear rod and a second elongated linear rod said rods being shorter than one-half the width of the closed mouth end of the bag.

10. The apparatus of claim 8 wherein the outlet includes a tubular member having a plurality of holes and a sleeve surrounding the tubular member selectively movable relative to the member to open and close said holes.

11. The apparatus of claim 8 wherein: the mouth of the bag has a hem surrounding the first rigid member and the second rigid member.

12. An apparatus for moving fluid into a receiver having an inlet comprising: a collapsible bag having a flexible wall, a mouth selectively movable to open and close positions, an outlet secured to said wall, said outlet attachable to the inlet of a receiver whereby fluid in the bag can flow into the receiver, and closure means associated with the mouth of the bag for closing the mouth to trap fluid in the bag whereby when the volume of the bag is reduced fluid is directed from the bag into the receiver, said closure means including at least one normally elongated linear member retained by one side of the mouth of the bag, said linear member adapted to be rolled with the mouth and permit the rolled mouth of the bag to be bent into a general V-shape so that the bent mouth can be forced into the bag.

13. The apparatus of claim 12 wherein the linear member is a normally elongated linear flexible member extended across one side of the mouth.

14. The apparatus of claim 12 wherein normally elongated linear flexible members are attached to opposite sides of the mouth.

References Cited

UNITED STATES PATENTS

| 1,787,153 | 12/1930 | Huffman | 230—160 |
| 2,423,890 | 7/1947 | Hurt | 230—160 |
| 3,120,167 | 2/1964 | Kearny | 230—160 |
| 3,297,241 | 1/1967 | Andreasson | 230—160 |
| 3,456,873 | 7/1969 | Lindquist | 230—160 |

WILLIAM L. FREEH, Primary Examiner

W. J. GOODLIN, Assistant Examiner

U.S. Cl. X.R.

417—474